United States Patent
Joo et al.

(10) Patent No.: US 8,223,665 B2
(45) Date of Patent: Jul. 17, 2012

(54) MOBILE IPTV SYSTEM AND METHOD OF PROVIDING MOBILE IPTV SERVICE

(75) Inventors: Hyunchul Joo, Gyeongbuk (KR); Dai-Boong Lee, Gyeongbuk (KR); Wan Kim, Gyeongbuk (KR); Hwangjun Song, Gyeongbuk (KR); Hyung Rai Oh, Gyeongbuk (KR)

(73) Assignee: Postech Academy-Industry Foundation, Gyeongbuk (KR)

( * ) Notice: Subject to any disclaimer, the term of this patent is extended or adjusted under 35 U.S.C. 154(b) by 303 days.

(21) Appl. No.: 12/548,370

(22) Filed: Aug. 26, 2009

(65) Prior Publication Data

US 2011/0026470 A1    Feb. 3, 2011

(30) Foreign Application Priority Data

Jul. 31, 2009   (KR) .................. 10-2009-0070337

(51) Int. Cl.
*H04N 7/173* (2006.01)
(52) U.S. Cl. ........................... 370/252; 370/465
(58) Field of Classification Search .................. 370/252, 370/465
See application file for complete search history.

(56) References Cited

U.S. PATENT DOCUMENTS

| | | | |
|---|---|---|---|
| 2008/0247460 A1* | 10/2008 | Kang et al. | 375/240.02 |
| 2009/0092174 A1* | 4/2009 | Wang | 375/132 |
| 2011/0222462 A1* | 9/2011 | Ho et al. | 370/312 |

FOREIGN PATENT DOCUMENTS

| | | |
|---|---|---|
| KR | 10-2006-0066858 A | 6/2006 |
| KR | 10-2007-0050579 A | 5/2007 |
| KR | 10-2007-0120634 A | 12/2007 |
| KR | 10-2008-0017662 A | 2/2008 |
| KR | 100874094 B1 | 12/2008 |
| KR | 10-2009-0059475 | 6/2009 |
| WO | 2008/025695 A1 | 3/2008 |

OTHER PUBLICATIONS

J. She et al., 'A Framework of Cross-Layer Superposition Coded Multicast for Robust IPTV Services over WiMAX', 2008 IEEE, pp. 3139-3144.*

* cited by examiner

*Primary Examiner* — Melvin Marcelo
(74) *Attorney, Agent, or Firm* — Osha Liang LLP

(57) ABSTRACT

A mobile IPTV system and a method of providing a mobile IPTV service are provided. The mobile IPTV system includes an IPTV head end, a base station, and a mobile terminal. The IPTV head end encodes data for an IPTV stream into a base layer and an enhancement layer and outputs the encoded data. The base station receives the IPTV stream from the IPV head end and partially truncates the enhancement layer of the IPTV stream according to a combination of a modulation technique and a cording rate which are determined in advance and outputs a transmission IPTV stream. The mobile terminal receives the transmission IPTV stream from the base station. Since an IPTV service is provided in view of a user distribution characteristic of a network, user can be efficiently provided with satisfactory QoS.

14 Claims, 10 Drawing Sheets

FIG. 3A
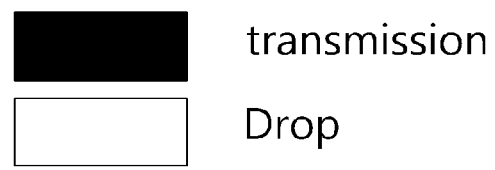
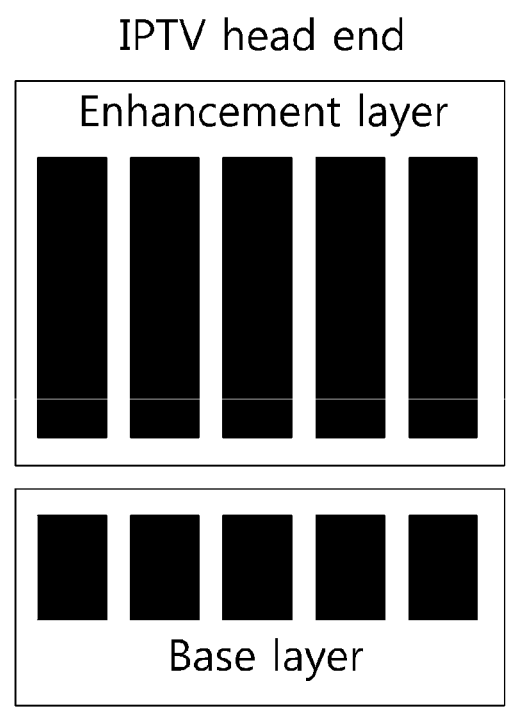

FIG. 3B
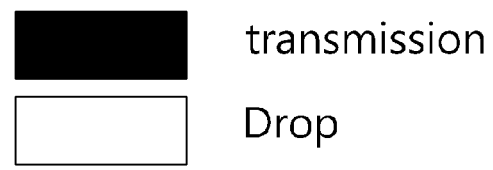
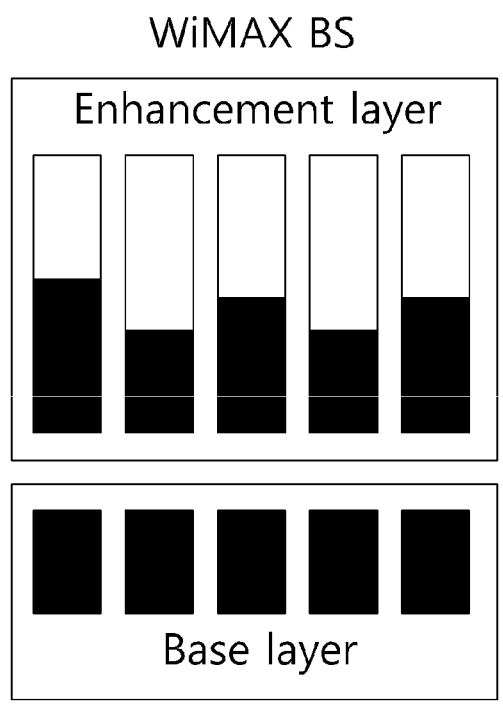

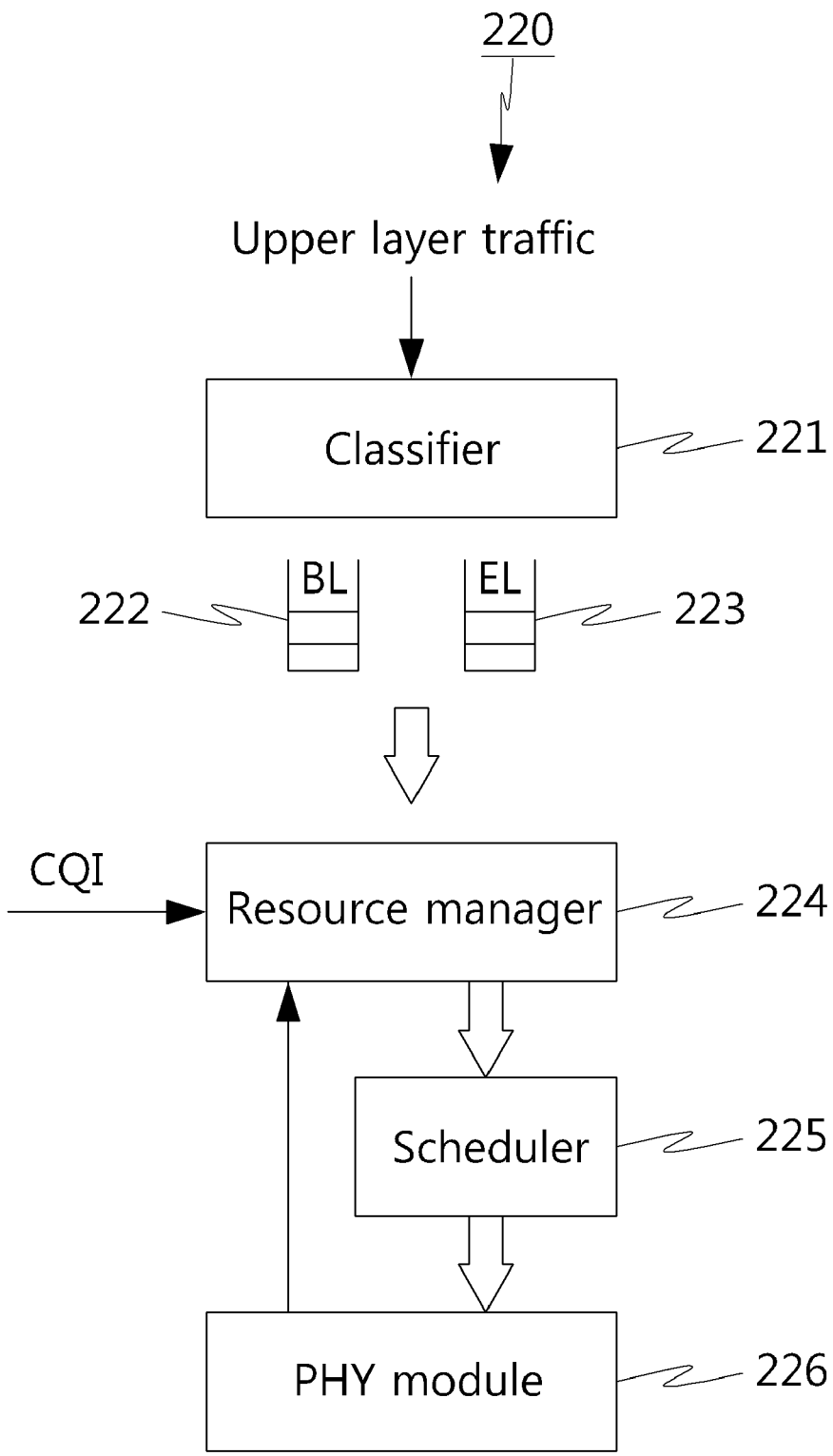

FIG. 7
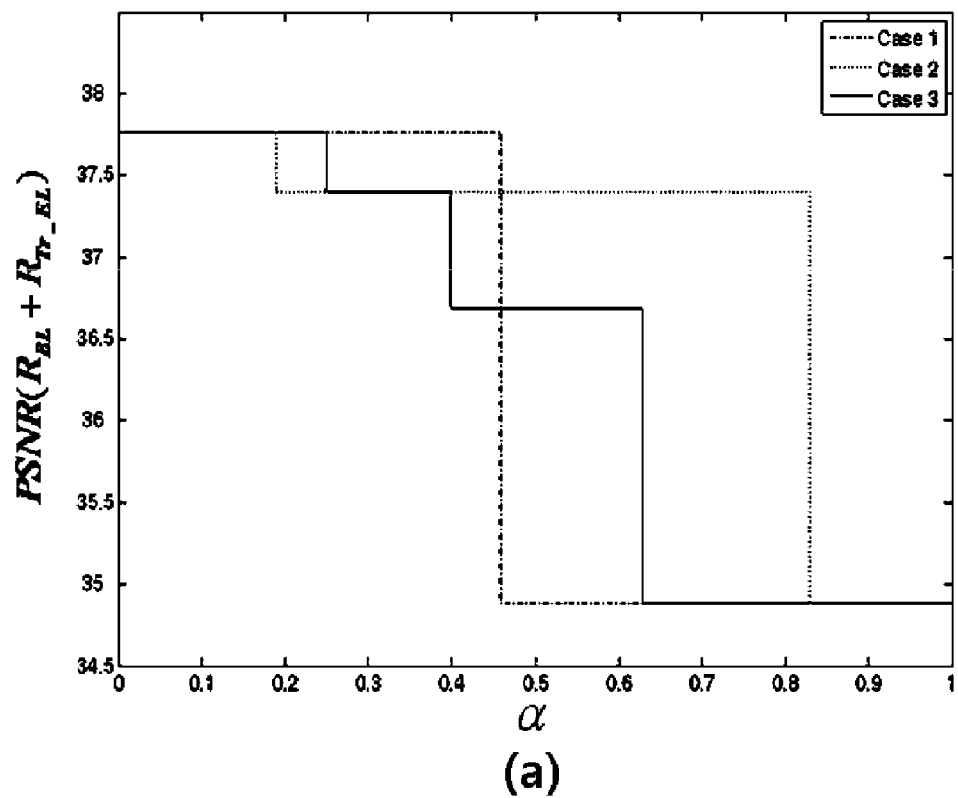
(a)
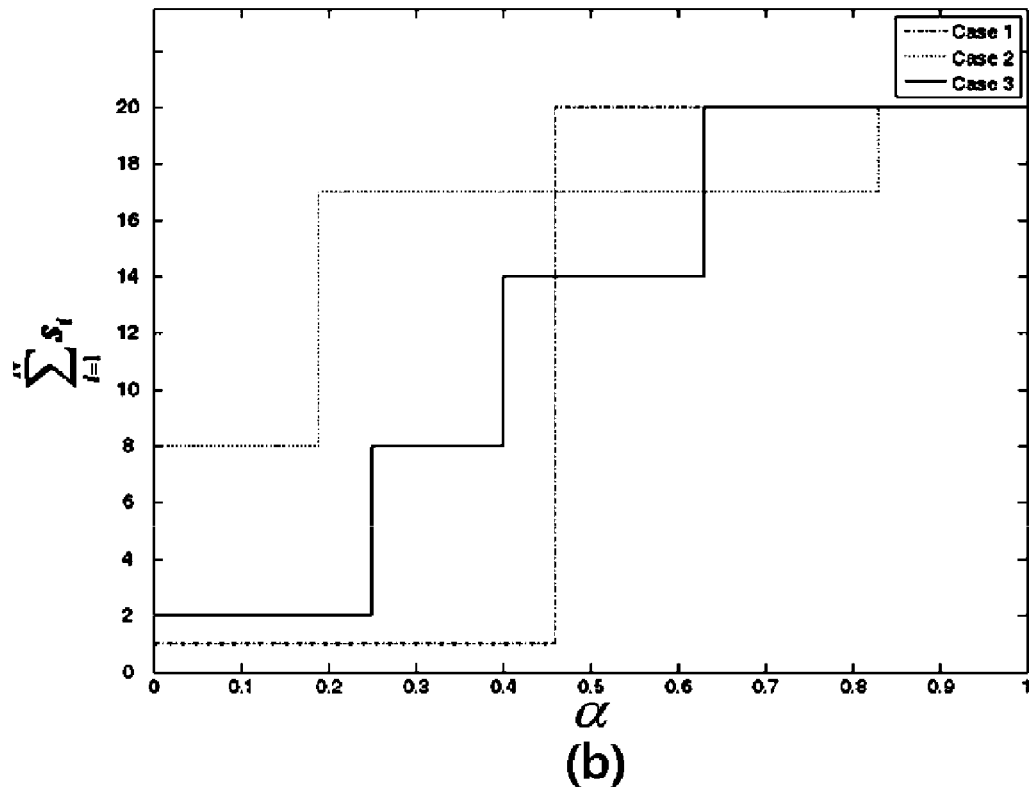
(b)

FIG. 8
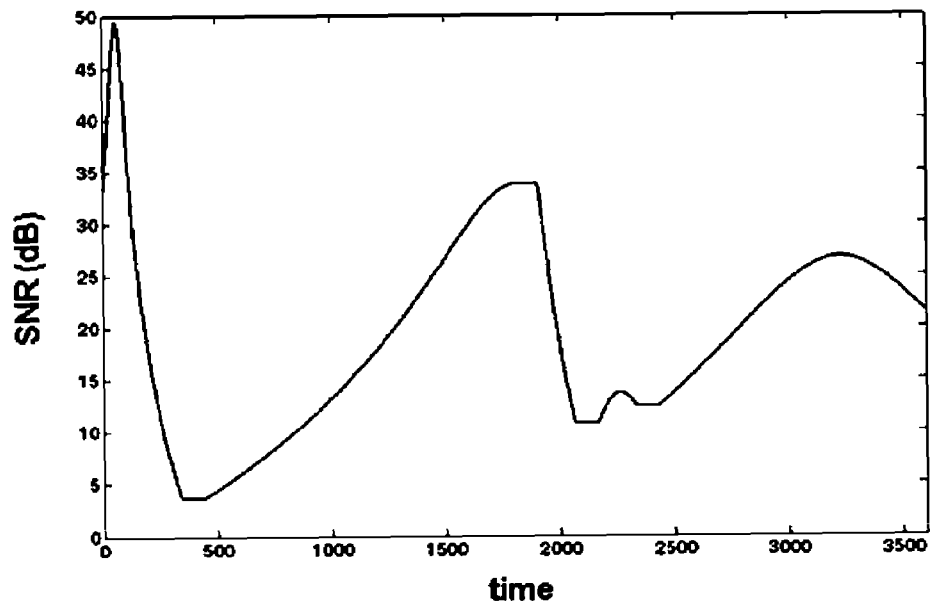
(a)
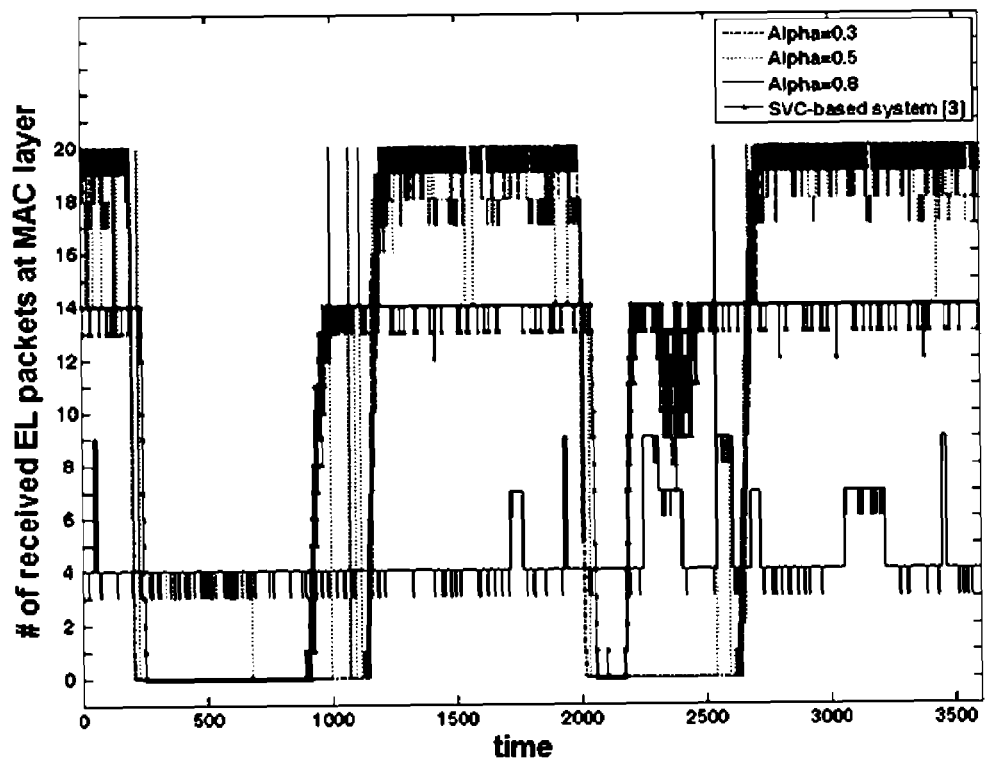
(b)

MOBILE IPTV SYSTEM AND METHOD OF PROVIDING MOBILE IPTV SERVICE

CLAIM FOR PRIORITY

This application claims priority to Korean Patent Application No. 2009-70337 filed on Jul. 31, 2009 in the Korean Intellectual Property Office (KIPO), the entire contents of which are hereby incorporated by reference.

BACKGROUND

1. Technical Field

Example embodiments of the present invention relates in general to a mobile Internet protocol television (IPTV) service, and more particularly, to a mobile IPTV system and a method of providing a mobile IPTV service.

2. Description of the Related Art

Television has been being evolved continuously from digital television to mobile television (for example, digital multimedia broadcasting (DMB), digital video broadcasting (DVB), and mediaFLO) which is portable television. International Telecommunication Union Telecommunication Standardization Sector (ITU-T) launched IPTV Focus Group (FG IPTV) in 2006, and television is rapidly moving to a new type of television called Internet protocol television (IPTV).

A technology which provides an IPTV service is disclosed, for example, in International Patent Application No. PCT/EP2007/058611.

Since existing IPTV uses a method which transmits Internet protocol (IP)-based various contents to users via an IP network, in order to expand to mobile IPTV, a user environment has to be wireless. A technology for mobile IPTV is not limited to a certain wireless technology, but as an initial type of a mobile IPTV technology, WiMAX (WiBro in Korea) which is a wideband wireless access technology has been recently developed to provide an IPTV service. Further, a wireless technology is being expanded to more efficiently transmit multimedia contents such as an IPTV service through a corresponding wireless technology.

Recently, as an image coding technique develops and a wideband network is spread, interests and demands of users for multimedia services through the Internet are increasing. Particularly, an IPTV service is being regarded as main applications in an information technology (IT) market and is being expected to be expanded to a mobile IPTV service in the near future with the growth of wireless devices and wireless networks. As a representative wireless network for providing a mobile IPTV service, a WiMAX network which has a high data rate, supports Quality of Service (QoS) differentiated according to a service and provides a multicast broadcast service (MBS) is being spotlighted.

In providing a mobile IPTV service within the WiMAX network, it is very important to efficiently utilize wireless resources and smoothly provide Quality of Experience (QoE) to users, and thus researches on that is actively being conducted.

SUMMARY

Accordingly, example embodiments of the present invention are provided to substantially obviate one or more problems due to limitations and disadvantages of the related art.

Example embodiments of the present invention provide a mobile IPTV system and a method of providing a mobile IPTV service in which an encoded image is efficiently transmitted in the WiMAX network using an H.264 medium-grain scalability (MGS) technique.

Example embodiments of the present invention also provide a mobile IPTV system and a method of providing a mobile IPTV service in which a high quality image service is provided to as many users as possible using limited wireless resources.

A mobile Internet protocol television (IPTV) system includes: an IPTV head end which encodes data for an IPTV stream into a base layer and an enhancement layer and outputs the encoded data; a base station which receives an IPTV stream from the IPV head end and partially truncates the enhancement layer of the IPTV stream according to a combination of a modulation technique and a cording rate which are determined in advance and outputs a transmission IPTV stream; and a mobile terminal which receives the transmission IPTV stream from the base station.

A method of providing a mobile Internet protocol television (IPTV) service to a mobile terminal in a mobile IPTV system including an IPTV head end and a base station of an access network, includes: at the IPTV head end, encoding data for an IPTV stream into a base layer and an enhancement layer and outputting the encoded data; and at the base station, receiving an IPTV stream from the IPV head end, partially truncating the enhancement layer of the IPTV stream according to a combination of a modulation technique and a cording rate which are determined in advance and outputting a transmission IPTV stream to the mobile terminal.

BRIEF DESCRIPTION OF THE DRAWINGS

Example embodiments of the present invention will become more apparent by describing in detail example embodiments of the present invention with reference to the accompanying drawings, in which:

FIGS. 3A to 3C are views illustrating a transmission process of an IPTV channel stream;

FIG. 4 is a block diagram of a base station according to an exemplary embodiment of the present invention;

FIGS. 7A and 7B are graphs illustrating a change of an image PSNR value according to a change of $\alpha$ and a change of the number of users who receive an enhancement layer according to a change of $\alpha$, respectively; and FIGS. 8A and 8B are graphs illustrating a performance for a user in a mobile IPTV system according to an exemplary embodiment of the present invention.

DETAILED DESCRIPTION OF EXAMPLE EMBODIMENTS

Figure 1:
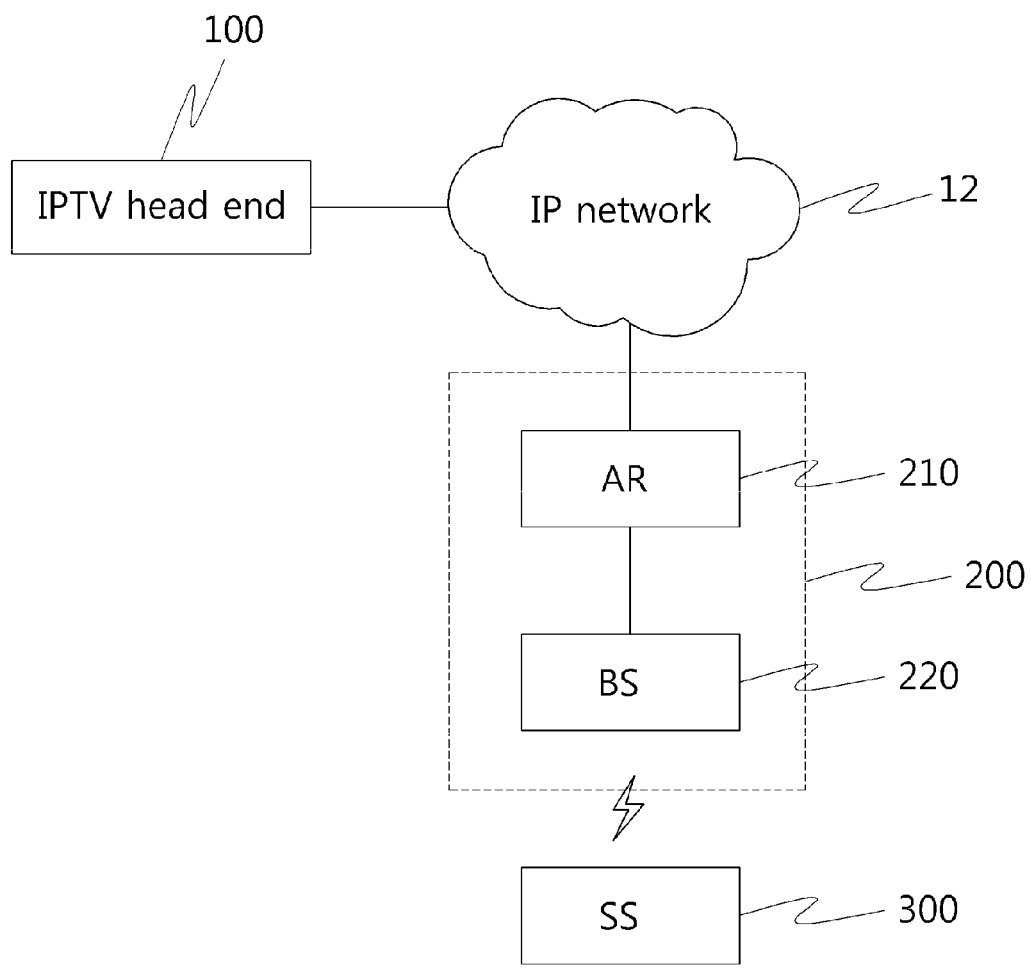
FIG. 1 is a block diagram of an image processing apparatus according to an exemplary embodiment of the present invention.

While the invention is susceptible to various modifications and alternative forms, specific embodiments thereof are shown by way of example in the drawings and will herein be described in detail.

However, it should be understood that there is no intent to limit the invention to the particular forms disclosed, but on the contrary, the invention is to cover all modifications, equivalents, and alternatives falling within the spirit and scope of the invention. In the drawings, like reference numerals denote like parts. In the drawings, like parts are denoted by like reference numerals even though illustrated in different drawings. In the following description, a detailed description of known functions and configurations incorporated herein will be omitted when it may make the subject matter of the present invention rather unclear.

It will be understood that, although the terms first, second, A, B, etc. may be used herein to describe various elements, these elements should not be limited by these terms. These terms are only used to distinguish one element from another.

For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, exemplary embodiments of the present invention will be described in detail with reference to the accompanying drawings. FIG. 1 is a block diagram of an image processing apparatus according to an exemplary embodiment of the present invention.

According to the present invention, in order to provide a high quality image service to as many users as possible, a base station (BS) partially truncates (drops) a received IPTV stream based on link states of users and transmits the truncated IPTV stream to users through a multicast broadcast service (MBS) zone.

FIG. 1 is a view illustrating a mobile IPTV system according to an exemplary embodiment of the present invention. Referring to FIG. 1, the mobile IPTV system includes an IPTV head end 100, an IP network 12, a WiMAX network 200 as an access network, and a subscriber station (SS) or a mobile terminal 300.

The IPTV head end 100 receives a broadcast channel from a broadcasting system such as a cable broadcasting system, a satellite broadcasting system, and a terrestrial broadcasting system, encodes the received broadcast channel into a format suitable for transmission, and transmits the encoded broadcast channel to the WiMAX network 200 using an IP multicast technique in order to increase network efficiency.

The IPTV head end 100 encodes the broadcast channel using a scalable video coding (SVC) technique.

In detail, the IPTV head end 100 uses a H.264/AVC SVC coding technique which is an extension of an H.264/AVC standard. The H.264/AVC makes an image dynamically adaptive to a change of an available bandwidth through a hierarchical structure. The H.264/AVC SVC provides a method of representing spatial scalability, temporal scalability, and quality scalability through one stream. The temporal scalability is implemented to be able to extract various frame rates from one coded stream using a hierarchical B structure. The spatial scalability and the quality scalability are configured by one base layer and multiple enhancement layers. A frame of the base layer includes a minimum resolution or minimum image quality and is implemented in a manner similar to the H.264/AVC to maintain compatibility with the H.264/AVC. The enhancement layers provide improved resolution and image quality, and the higher the enhance layer is, the higher the resolution or the image quality is.

According to an exemplary embodiment of the present invention, the IPTV head end 100 encodes data for an IPTV stream into a base layer and an enhancement layer according to the H.264/AVC SVC coding method. The base layer includes information necessary for image quality reproduction. The enhancement layer allows a slight image quality improvement packet loss and is used to increase image quality of the base layer.

Figure 2:
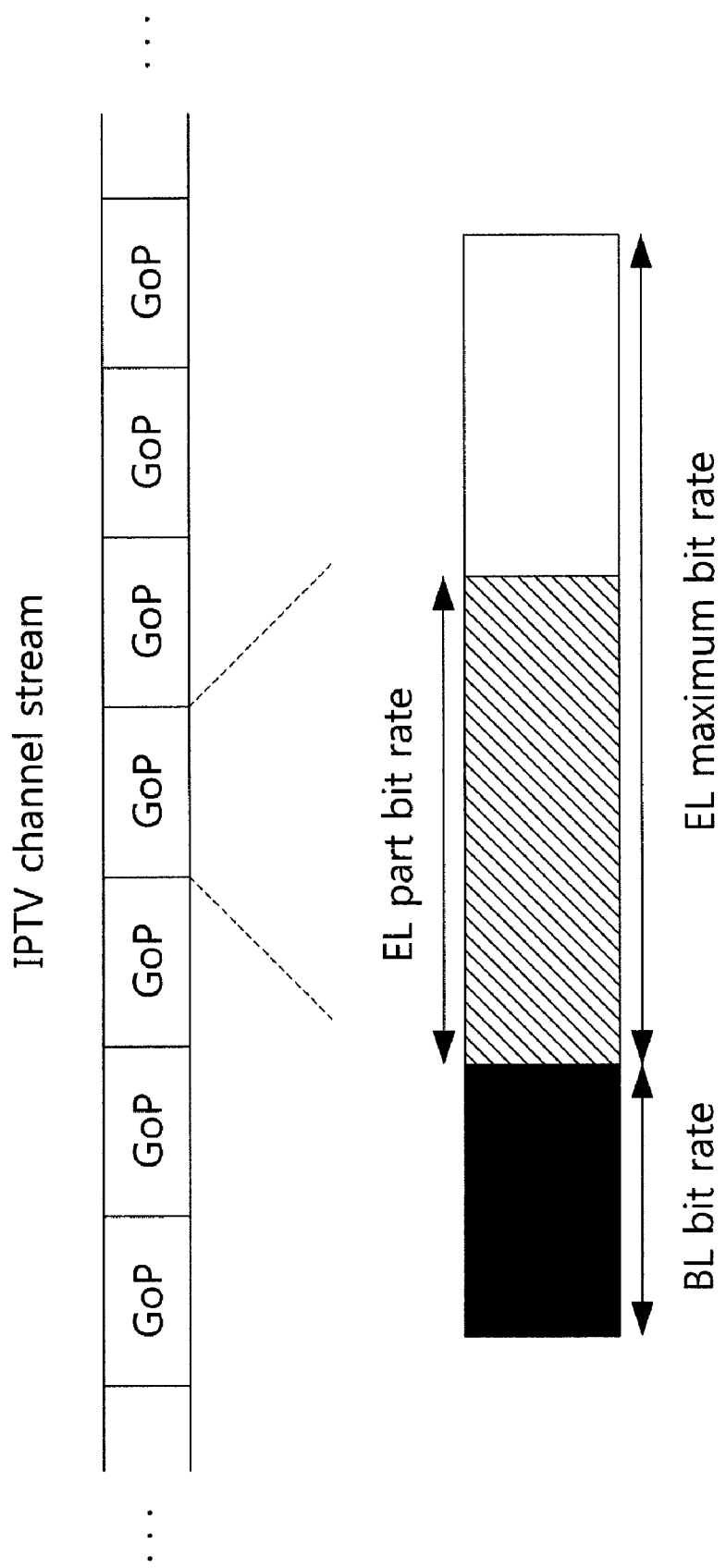
FIG. 2 is a view illustrating a structure of an IPTV stream encoded using an H.264/AVC SVC coding technique according to an exemplary embodiment of the present invention.

FIG. 2 is a view illustrating a structure of an IPTV stream encoded using the H.264/AVC SVC coding technique according to an exemplary embodiment of the present invention.

As illustrated in FIG. 2, H.264/AVC SVC coding is performed in units of group of pictures (GOPs). The base layer is encoded at a fixed bit rate, and a sparse modulation technique and a low coding rate are applied.

The WiMAX network 200 is connected to an Internet backbone network, that is, the IP network 12 to receive an IPTV stream from the IPTV head end 100 and transmit the IPTV stream to the mobile terminal 300. To this end, the WiMAX network 200 includes an access router (AR) 210 and a base station (BS) 220. The access router 210 routes IP packets received from the IP network 12 to the base station 220. The base station 220 performs communications with the mobile terminal 300 through a wireless interface.

The base station 220 receives the IPTV stream which is encoded into the base layer and the enhancement layer according to the H.264/AVC SVC coding technique, transmits the base layer to the mobile terminal 300 and partially transmits the enhancement layer to the mobile terminal 300 according to a modulation technique and a coding rate which are determined in advance.

That is, the base station 220 can provide a basic image service to as many users as possible within a cell through the base layer. Further, the base station 220 can transmit the IPTV stream adaptively to a variable coding rate to the mobile terminal 300 using the enhancement layer. The mobile terminal 230 supports WiMAX and is connected to the WiMAX network 200 to receive an IPTV channel stream transmitted from the WiMAX network 200.

Figure 3C:
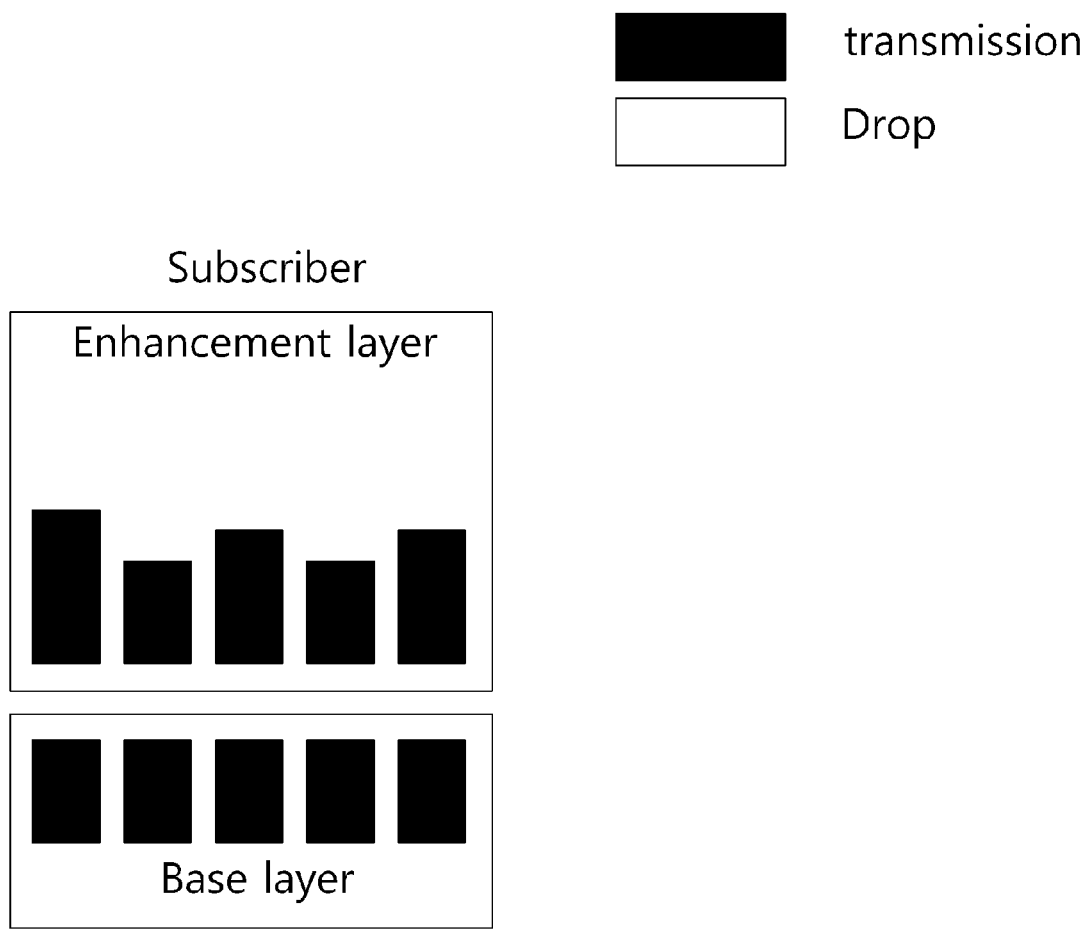

FIGS. 3A to 3C illustrate a transmission process of an IPTV channel stream.

FIG. 3A illustrates an IPTV channel stream output from the IPTV head end 100, FIG. 3B illustrates an IPTV channel stream output from the base station 220 of the WiMAX network 200, and FIG. 3C illustrates an IPTV channel stream input to the mobile station 300.

The IPTV channel stream is encoded into a base layer and an enhancement layer as illustrated in FIG. 3A. The base station 220 of the WiMAX network 200 receives the IPTV channel stream output from the IPTV head end 100 and partially truncates (drops) the enhancement layer of the IPTV channel stream, for example, a white part in FIG. 3B, according to a modulation technique and a coding rate which are determined in advance. Therefore, the IPTV channel stream illustrated in FIG. 3C is received by the mobile terminal 300.

That is, the base layer is encoded at a fixed rate, and a sparse modulation technique and a low coding rate are applied to provide a basic image service to as many users as possible within a cell. On the other hand, for the enhancement layer, the truncated stream is transmitted to users at a modulation technique and a coding rate which are selected in the base station 220 as illustrated in FIGS. 3A to 3C.

According to an exemplary embodiment of the present invention, a case in which truncation is performed for one enhancement layer, that is, a case in which medium-gain scalability (MGS) coding is applied to an enhancement layer, has been described, but the present invention is not limited to this.

According to another exemplary embodiment of the present invention, truncation may be performed for a base layer and multiple enhancement layers. In this case, the base station 220 may determine how many enhancement layers are to be transmitted.

The base station 220 uses several combinations between available modulation techniques and coding rates for IPTV stream transmission. Combinations between modulation techniques and coding rates are numbered from 1 to $MC_{Max}$ in an order robust to a wireless channel error and are abbreviated to mc. Examples of mcs are shown in Table 1.

TABLE 1

| mc | Modulation, Overall coding rate | $R_{slot}$(mc) |
|---|---|---|
| 1 | 64QAM, ¾ | 216 |
| 2 | 64QAM, ⅔ | 192 |
| 3 | 16QAM, ¾ | 144 |
| 4 | 16QAM, ½ | 96 |
| 5 | QPSK, ¾ | 72 |
| 6 ($MC_{Max}$) | QPSK, ½ | 48 |

$R_{slot}$(mc) denotes the number of data bits which can be transmitted per slot on a physical layer and may be computed as in Equation 1.

$$R_{slot}(mc) = 24*2*M_{mc}*C_{mc}, \quad \text{Equation 1.}$$

In Equation 1, $M_{mc}$ and $C_{mc}$ denote the number of bits per symbol and a coding rate, respectively. For example, when a modulation technique is Quadrature Phase Shift Keying (QPSK) and a coding rate is ¾, the number of data bits which can be transmitted per slot, that is, $R_{slot}$(mc) is 72. $\vec{mc}$ is a vector representing a modulation technique and a coding rate which correspond to a link state of each user and may be defined as in Equation 2.

$$\vec{mc} = (mc_1, mc_2, \ldots, mc_N) \quad \text{Equation 2.}$$

In Equation 2, N denotes a total of the number of users within a cell, and $mc_1$ denotes a smallest value among mcs which can smoothly support an i-th user. $\vec{s} = (S_1, S_2, \ldots, S_N)$ represents whether or not each user can smoothly receive an enhancement layer when the base station 220 transmits the enhancement layer at mc($mc_{EL}$) and may be defined as in Equation 3.

$$s_i(mc_i, mc_{EL}) = \begin{cases} 1 & \text{if } mc_i \leq mc_{EL}, \\ 0 & \text{otherwise.} \end{cases} \quad \text{Equation 3}$$

As described above, the base station 220 considers a correlation between the number of users, within a cell, who receive the enhancement layer using limited resources and their image quality, and the correlation may be represented as in Equation 4. The base station 220 computes $mc_{EL}$ and $R_{Tr\_EL}$ which make Equation 4 maximum.

$$\alpha \frac{\sum_{i=1}^{N} s_i(mc_i, mc_{EL})}{N} + \\ (1-\alpha)\left(\frac{PSNR(R_{BL} + R_{Tr\_EL}) - PSNR(R_{BL})}{PSNR(R_{BL} + R_{EL}) - PSNR(R_{BL})}\right). \quad \text{Equation 4}$$

A first term of Equation 4 represents the number of users who receives an enhancement layer stream regardless of whether or not to perform truncation, and a second term represents a ratio between an image peek signal to noise ratio (PSNR) value in which enhancement layer stream truncation is not performed and an image PSNR value in which enhancement layer stream truncation is performed.

α denotes a weight value between the two terms and is a constant (0≦α≦1). $mc_{BL}$ represents fixed mc for base layer transmission. $R_{BL}$ and $R_{EL}$ represent bit amounts of the base layer and the enhancement layer which come out of an upper layer during a GOP interval, and $R_{Tr\_EL}$ represents a bit amount of the truncated enhancement layer which is to be transmitted from the base station 220.

Computing $mc_{EL}$ and $R_{Tr\_EL}$ which make Equation 4 maximum as described above has a limitation of Equation 5. That is, the base layer and the truncated enhancement layer have to be transmitted during a GOP interval within the number of slots allocated for an IPTV stream, and this may be represented as in Equation 5.

$$\left\lceil \frac{R_{Tr\_EL} + R_{overhead}(R_{Tr\_EL})}{R_{slot}(mc_{EL})} \right\rceil \leq \quad \text{Equation 5}$$

$$Slot_{max} - \left\lceil \frac{R_{BL} + R_{overhead}(R_{BL})}{R_{slot}(mc_{BL})} \right\rceil.$$

⌈x⌉ represents a smallest integer value which is larger than x. $R_{overhead}(R)$ represents a MAC header and a cyclic redundancy check (CRC) bit added in a MAC layer to transmit an R bit coming down from an upper layer. $Slot_{max}$ denotes a maximum of the number of slots allocated in a physical layer for IPTV stream transmission during a GOP interval. PSNR (R) denotes an estimation PSNR value when a bit rate during a GOP interval is R and may be defined as in Equation 6.

$$PSNR(R) = \alpha_1 R + \alpha_2 \quad \text{Equation 6.}$$

In Equation 6, $\alpha_1$ and $\alpha_2$ are model parameters.

As described above, the base station 220 determines a modulation technique and a coding rate based on a channel quality indicator (CQI) transmitted from the mobile terminal 300, partially truncates the enhancement layer of an IPTV channel stream according to the determined modulation technique and coding rate, and transmits the resultant IPTV channel stream to the mobile terminal 300.

Next, a configuration and operation of the base station 220 will be described in detail with reference to FIG. 4.

FIG. 4 is a block diagram of the base station 220 according to an exemplary embodiment of the present invention.

Referring to FIG. 4, the base station 220 includes a classifier 221, a base layer buffer 222, an enhancement layer buffer 223, a resource manager 224, a scheduler 225, and a PHY module 226.

The classifier 221 receives an IPTV channel stream from the IPTV head end 100 through the IP network 12. That is, the IPTV channel stream encoded into the base layer and the enhancement layer according to the H.264/AVC SVC coding technique is received. The classifier 221 classifies packets of the received IPTV channel stream into packets for the base layer and packets for the enhancement layer and outputs the packets for the base layer to the base layer buffer 222 and the packets for the enhancement layer to the enhancement layer buffer 223. At this time, the classifier 221 may allocate multicast connection identifications (MCIDs) to the packets for the base layer and the packets for the enhancement layer. That is, since the base station 220 transmits the enhancement layer in a broadcasting manner when transmitting the base layer and the truncated enhancement layer, an MCID has to be allocated to the packets for the enhancement layer in order for the mobile terminal 300 to identify the enhancement layer.

The resource manager 224 receives CQIs included in uplink sub frames transmitted from the mobile terminals 300. The resource manager 224 perceives link states of users within a cell based on the CQIs and updates $\vec{mc}$ based on the link states.

The resource manager 224 determines a ($mc_{EL}$, $R_{Tr\_EL}$) combination which makes Equation 4 maximum while satisfying a slot-related limitation based on $\vec{mc}$ and performs stream truncation for the enhancement layer based on the ($mc_{EL}$, $R_{Tr\_EL}$) combination. $R_{Tr\_EL}$ is a transmission bit amount of the truncated enhancement layer as a result in which stream truncation has been performed for the enhancement layer. The resource manager 224 outputs the IPTV stream in which stream truncation has been performed to the scheduler 225. That is, the remainder "$R_{EL}-R_{Tr\_EL}$" of the enhancement layer (EL) stream is removed from a corresponding buffer, that is, the second buffer 223.

The scheduler 225 receives the IPTV stream in which stream truncation has been performed from the resource manager 224 and transmits the IPTV stream $R_{Tr\_EL}$ to users according to a modulation technique and a coding rate which correspond to $mc_{EL}$ through the MBS zone.

Figure 5:
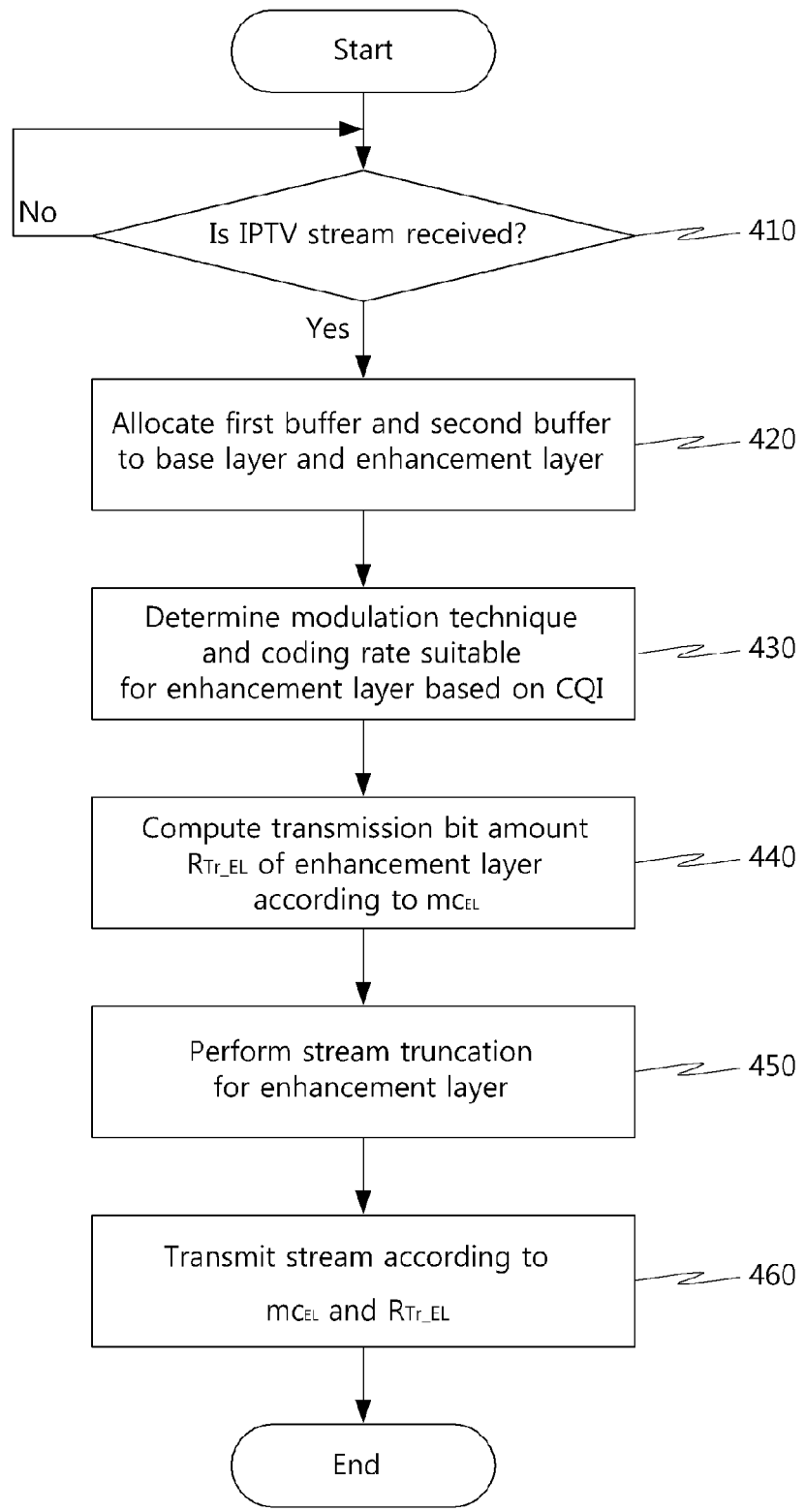
FIG. 5 is a flowchart illustrating a method of providing an IPTV service to mobile terminals from a base station according to an exemplary embodiment of the present invention.

Next, a method of providing an IPTV service to the mobile terminals from the base station according to an exemplary embodiment of the present invention will be described with reference to FIG. 5.

Referring to 5, the base station 220 determines whether or not an IPTV stream is received from the IPTV head end 100 (step 410). The base station 220 transmits the IPTV stream received from the IPTV head end 100 to the mobile terminal 300. The IPTV stream is encoded into the base layer and the enhancement layer. As described above, a frame of the base layer includes a minimum resolution or minimum image quality and is implemented in a manner similar to H.264/AVC to maintain compatibility with H.264/AVC. The enhancement layers provide improved resolution and image quality, and the higher the enhance layer is, the higher the resolution or the image quality is.

The base station 220 receives the IPTV stream from the IPTV head end 100 in a multicasting manner. Thereafter, the base station 220 allocates a first buffer and a second buffer to the base layer and the enhancement layer of the IPTV stream received from the IPTV head end 100, respectively (step 420). In this case, the base station 220 may allocate MCIDs to the first buffer for the base layer and the second buffer for the enhancement layer, respectively. The base station 220 stores a first layer (for example, the base layer) of the received IPTV stream in the first buffer and a second layer (for example, the enhancement layer) of the received IPTV stream in the second buffer.

According to another exemplary embodiment of the present invention, the buffers may be allocated to a stream for the base layer and a stream for the enhancement layer in advance.

Next, the base station 220 determines a modulation technique and a coding rate $mc_{EL}$ which are suitable for the enhancement layer based on the CQIs (step 430). As described above, the base station 220 is periodically informed of link states of users within a cell through the CQIs included in the uplink sub frames. The base station 220 may update a vector $\vec{mc}$ which represents a modulation technique and a coding rate which correspond to link states of users.

The base station 220 computes a transmission bit amount $R_{Tr\_EL}$ of the enhancement layer according to $mc_{EL}$ (step 440). The transmission bit amount is determined to make Equation 4 maximum while satisfying a slot limitation.

The transmission bit amount $R_{Tr\_EL}$ of the enhancement layer is computed by the following steps.

Step 1: The base station 220 computes corresponding $R_{Tr\_EL}^{*}(mc_{EL})$ using Equation 7 for as all $mc_{EL}$s ($1 \leq mc_{EL} \leq MC_{Max}$) as possible. As $mc_{EL}$ increases, corresponding $R_{Tr\_EL}^{*}(mc_{EL})$ decreases (if $mc_{EL}^{i} > mc_{EL}^{j}$, $R_{Tr\_EL}^{*}(mc_{EL}^{i}) < R_{Tr\_EL}^{*}(mc_{EL}^{j})$).

$$R_{Tr\_EL}^{*}(mc_{EL}^{j}) = \text{argmin} P(mc_{EL}^{j}, r) \text{ for } R_{Tr\_EL}^{*}(mc_{EL}^{i}) < r \leq R_{EL}, \quad \text{Equation 7}$$

where, $$P(mc_{EL}, r) = \begin{cases} Slot_{residue}(mc_{EL}, r) & \text{if } Slot_{residue}(mc_{EL}, r) \geq 0 \\ \infty & \text{otherwise} \end{cases},$$

and, $$Slot_{residue}(mc_{EL}, r) = Slot_{max} - \left\lceil \frac{R_{\omega} + R_{overhead}(R_{BL})}{R_{slot}(mc_{BL})} \right\rceil - \left\lceil \frac{r + R_{overhead}(r)}{R_{slot}(mc_{EL})} \right\rceil.$$

Step 2: The base station 220 selects a ($mc_{EL}^{*}, R_{Tr\_EL}^{*}$) combination which provides a maximum value to an evaluation function such as Equation 8.

$$(mc_{EL}^{*}, R_{Tr\_EL}^{*}) = \underset{(mc_{EL}, R_{Tr\_EL}^{*}(mc_{EL}))}{\text{argmax}} \left\{ \alpha \frac{\sum_{i=1}^{N} s_i(mc_i, mc_{EL})}{N} + (1-\alpha) \left( \frac{PSNR(R_{BL} + R_{Tr\_EL}) - PSNR(R_{BL})}{PSNR(R_{BL} + R_{EL}) - PSNR(R_{BL})} \right) \right\} \quad \text{Equation 8}$$

for $1 \leq mc_{EL} \leq MC_{Max}$.

When the truncation bit amount is determined, the base station 220 performs stream truncation for the enhancement layer according to the determined truncation bit amount (step 450). The base station 220 transmits stream which is truncated by $R_{Tr\_EL}$ at a modulation technique and a cording rate which correspond to $mc_{EL}$ through a physical layer to the mobile terminal 300 (step 460).

Therefore, according to an exemplary embodiment of the present invention, the base station 220 determines a modulation technique and a coding rate of the physical layer for the enhancement layer based on link states of users in consideration of a correlation between the number of users, within a cell, who are to receive the enhancement layer and their image quality and transmits the partial stream of the enhancement layer.

A result of evaluating the performance of the mobile IPTV system according to an exemplary embodiment of the present invention will be described below. In a first experiment, the performance of the algorithm of the present invention according to a change of a was evaluated, and in a second experiment, the performance of the mobile IPTV system of the present invention for users was compared and analyzed.

An experiment environment was implemented using an OPNET, and $PSNR(R_{BL}+R_{Tr\_EL})$ and $$\sum_{i=1}^{N} s_i$$

were used criteria representing the performance of the algorithm of the present invention. In the experiments, a wireline link bandwidth between the IPTV head end and the base station was set to 1 Gbps in the IPTV head end, and IP multicasting was supported. The number of users within a cell was set to twenty (20), and users were disposed in three forms as illustrated in FIGS. 6A to 6C.

Figure 6:
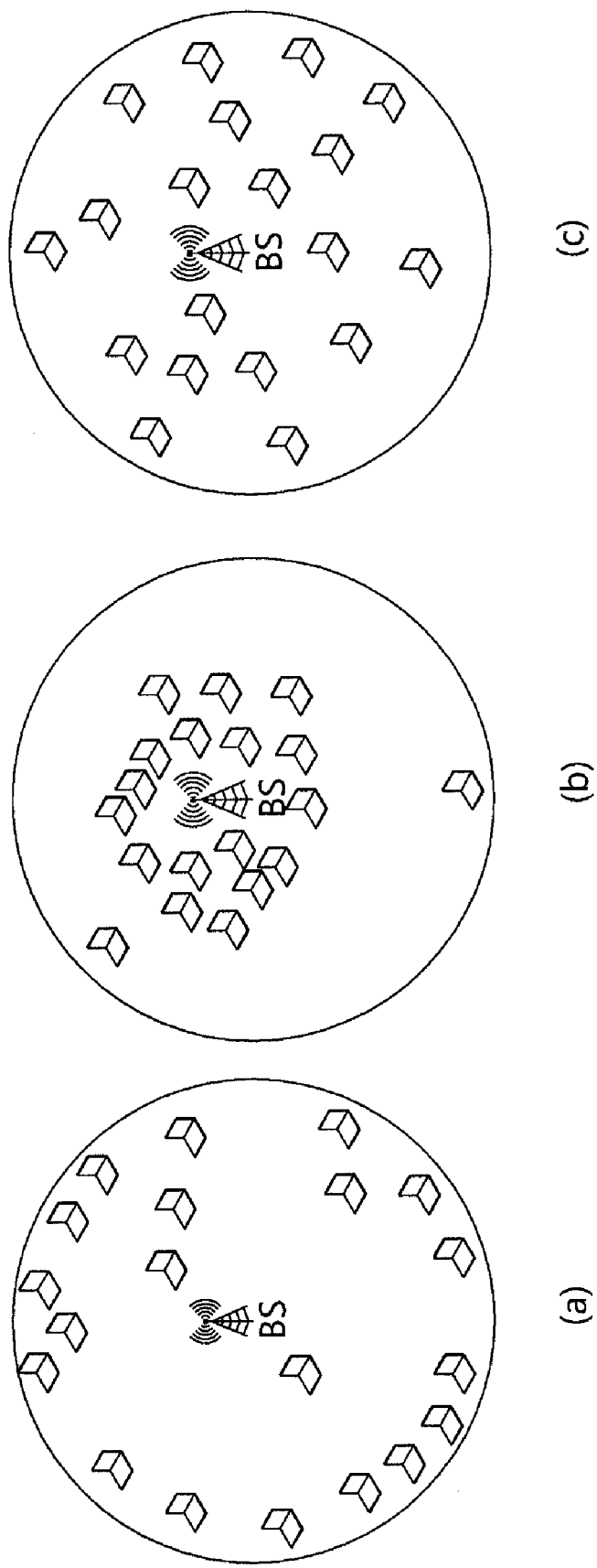
FIGS. 6A to 6C are views illustrating various arrangements of mobile terminals.

FIGS. 6A to 6C are views illustrating various arrangements of mobile terminals.

FIG. 6A illustrates a case in which most of users are distant from the base station, FIG. 6B illustrates a case in which most of users are around the base station, and FIG. 6C illustrates a case in which users are arbitrarily distributed within a cell.

The IPTV stream was encoded into the base layer and the enhancement layer using the H.264 MGS coding technique, and a GOP interval was set to 0.5333 seconds. Ten (10) real-time transport protocol (RTP) packets and twenty (20) RTP packets per GOP interval were periodically generated in the base layer and the enhancement layer, respectively, and the packet size was fixed to 1472 bytes. $Slot_{max}$ was 3700, and $R_{BL}$ and $R_{EL}$ were set to 120 kbits and 240 kbits, respectively. $R_{overhead}(R)$ was R/150. Parameter setting of modulation techniques and coding rates used during the experiments is shown in Table 1 described above. $mc_{BL}$ was fixed to 6 (QPSK, ½). Physical layer parameter setting is shown in Table 2. An Erceg-Greenstein path loss model was used.

TABLE 2

| Parameter | Value |
| --- | --- |
| Channel Bandwidth (MHz) | 20 |
| FFT size | 2048-FFT PUSC |
| Number of used data subcarriers | 1440 |
| Number of pilot subcarriers | 240 |
| Number of null & guardband subcarriers | 368 |
| Cyclic prefix or guard time | ⅛ |
| Oversampling rate | 28/25 |
| Subcarrier frequency spacing (kHz) | 10.94 |
| Useful symbol time (us) | 91.4 |
| Guard time (us) | 11.4 |
| OFDM symbol duration (us) | 102.86 |
| Number of OFDM symbols in 5 ms frame | 48 |
| UL/DL boundary | 1:3 |

The performance of the mobile IPTV system of the present invention according to a change of α is shown in Table 3. As α is smaller, the importance of the second term in computing Equation 4 under the slot limitation increases. Therefore, it is understood that $$\sum_{i=1}^{N} s_i$$

decreases, but $PSNR(R_{BL}+R_{Tr\_EL})$ increases.

$$\sum_{i=1}^{N} s_i$$

denotes the number of users who receive the enhancement layer, and $PSNR(R_{BL}+R_{Tr\_EL})$ denotes an image PSNR value in the case of receiving the base layer and the truncated enhancement layer.

That is, according to the present invention, as α is closer to 0, the enhancement layer is transmitted at a higher coding rate through a denser modulation technique. Therefore, only users having relatively good link states can watch a high quality image.

TABLE 3

| Subscribers' distribution | α | $mc_{EL}$ | $R_{Tr\_EL}$ (kbits) | PSNR ($R_{BL}$ + $R_{Tr\_EL}$) (dB) | $\sum_{i=1}^{N} s_i$ |
| --- | --- | --- | --- | --- | --- |
| Case 1 distribution | 0.00~0.45 | 64QAM, 3/4 | 240 | 37.76 | 1 |
| | 0.46~1.00 | QPSK, 1/2 | 48 | 34.88 | 20 |
| Case 2 distribution | 0.00~0.18 | 64QAM, 3/4 | 240 | 37.76 | 8 |
| | 0.19~0.82 | 64QAM, 2/3 | 216 | 37.40 | 17 |
| | 0.83~1.00 | QPSK, 1/2 | 48 | 34.88 | 20 |
| Case 3 distribution | 0.00~0.24 | 64QAM, 3/4 | 240 | 37.76 | 2 |
| | 0.25~0.39 | 64QAM, 2/3 | 216 | 37.40 | 8 |
| | 0.40~0.62 | 16QAM, 3/4 | 168 | 36.68 | 14 |
| | 0.63~1.00 | QPSK, 1/2 | 48 | 34.88 | 20 |

FIG. 7A is a graph illustrating a change of an image PSNR value according to a change of α, and FIG. 7B is a graph illustrating a change of the number of users who receive the enhancement layer according to a change of α.

Since a range of a value which $mc_{EL}$ can have is discontinuous, the number of users who receive the enhancement layer and the image PSNR value change in a step function form as illustrated in FIGS. 7A and 7B.

FIGS. 8A and 8B are graphs illustrating the performance of the mobile IPTV system of the present invention for users.

FIG. 8A illustrates a channel state of a user according to time, and FIG. 8B illustrates the number of received packets of the enhancement layer according to time.

The performance of the mobile IPTV system of the present invention for users will be described with reference to FIGS. 8A and 8B. According to the present invention, the base layer is transmitted using a QPSK modulation technique and a ½ coding, whereby image quality can be guaranteed for all users within a cell. However, in the case of the enhancement layer, $mc_{EL}$ on the physical layer is determined, and only users who maintain mc smaller than $mc_{EL}$ receive a bit stream of the enhancement layer as illustrated in FIGS. 8A and 8B.

It was proved through the experiments that the mobile IPTV system of the present invention efficiently provides the mobile IPTV service. Therefore, video content services of various forms can be provided to users through MBSs of WiBro which is currently in service in Korea and a 3GPP-based long term evolution (LTE) network. Further, since a user distribution characteristic of a network is considered, users can be efficiently provided with satisfactory QoS.

As described above, according to the present invention, a base station determines a modulation technique and a coding rate on a physical layer for an enhancement layer based on link states of users in consideration of a correlation between the number of users, within a cell, who are provided with the enhancement layer and their image quality and transmits the partial stream of the enhancement layer. Therefore, video content services of various forms can be provided to users through MBSs of WiBro which is currently in service in Korea and a 3GPP-based long term evolution (LTE) network. In particular, since a user distribution characteristic of a network is considered, users can be efficiently provided with satisfactory QoS.

While the example embodiments of the present invention and their advantages have been described in detail, it should be understood that various changes, substitutions and alterations may be made herein without departing from the scope of the invention.

What is claimed is:

1. A mobile Internet protocol television (IPTV) system, comprising:
    an IPTV head end which encodes data for an IPTV stream into a base layer and an enhancement layer and outputs the encoded data;
    a base station which receives an IPTV stream from the IPTV head end and partially truncates the enhancement layer of the IPTV stream according to a transmission bit amount of the enhancement layer computed according to a combination of a modulation technique and a coding rate, which are determined based on a link state of a mobile terminal received from the mobile terminal and outputs a transmission IPTV stream,
    wherein the mobile terminal receives the transmission IPTV stream from the base station.

2. The mobile IPTV system of claim 1, wherein the IPTV head end encodes data for the IPTV stream according to an H.264/AVC scalable video coding (SVC) coding technique.

3. The mobile IPTV system of claim 1, wherein the base station comprises:
    first and second buffers;
    a classifier which classifies packets of a received IPTV channel stream into packets for the base layer and packets for the enhancement layer, outputs the packets for the base layer to the first buffer and outputs the packets for the enhancement layer to the second buffer;
    a resource manager which receives the link state of the mobile terminal from the mobile terminal, determines the combination of the modulation technique and the coding rate to be applied to the enhancement layer based on the link state of the mobile terminal, computes the transmission bit amount of the enhancement layer according to the combination of the modulation technique and the coding rate, and performs stream truncation for a stream of the enhancement layer according to the transmission bit amount; and
    a scheduler which transmits an IPTV stream in which stream truncation has been performed to the mobile terminal according to the combination of the modulation technique and the coding rate when the IPTV stream in which stream truncation has been performed is received from the resource manager.

4. The mobile IPTV system of claim 3, wherein the classifier allocates multicast connection identifications (MCIDs) to the packets for the base layer and the packets for the enhancement layer.

5. The mobile IPTV system of claim 3, wherein the resource manager computes the combination of the modulation technique and the coding rate to be applied to the enhancement layer and the transmission bit amount of the enhancement layer to make following Equation maximum:

$$\alpha \frac{\sum_{i=1}^{N} s_i(mc_i, mc_{EL})}{N} + (1-\alpha)\left(\frac{PSNR(R_{BL} + R_{Tr\_EL}) - PSNR(R_{BL})}{PSNR(R_{BL} + R_{EL}) - PSNR(R_{BL})}\right),$$

where $\alpha$ represents a constant ($0 \leq \alpha \leq 1$), $mc_{BL}$ represents fixed mc for base layer transmission, $mc_{EL}$ represents fixed mc for enhancement layer transmission, $R_{BL}$ and $R_{EL}$ represent bit amounts of the base layer and the enhancement layer which come out of an upper layer during a GOP interval, $R_{Tr\_EL}$ represents a bit amount of a truncated enhancement layer which is to be transmitted, PSNR(R) represents an estimation peek signal to noise ratio (PSNR) value in which a bit rate during a GOP interval is R, $$\sum_{i=1}^{N} s_i$$

represents the number of users who receive the enhancement layer, and $PSNR(R_{BL}+R_{Tr\_EL})$ represents an image PSNR value when the base layer and the truncated enhancement layer are received.

6. The mobile IPTV system of claim 3, wherein the link state of the mobile terminal is acquired through a channel quality indicator (CQI).

7. The mobile IPTV system of claim 3, wherein the transmission bit amount of the enhancement layer is determined according to a slot limitation in which the base layer and the enhancement layer have to be transmitted within the number of slots allocated for the IPTV stream.

8. A method of providing a mobile Internet protocol television (IPTV) service to a mobile terminal in a mobile IPTV system including an IPTV head end and a base station of an access network, comprising:
    at the IPTV head end, encoding data for an IPTV stream into a base layer and an enhancement layer and outputting the encoded data; and
    at the base station, receiving an IPTV stream from the IPTV head end, partially truncating the enhancement layer of the IPTV stream according to a transmission bit amount of the enhancement layer computed according to a combination of a modulation technique and a coding rate, which are determined based on a link state of a mobile terminal received from the mobile terminal and outputting a transmission IPTV stream to the mobile terminal.

9. The method of claim 8, wherein the data for the IPTV stream is encoded into the base layer and the enhancement layer according to an H.264/AVC SVC coding technique.

10. The method of claim 8, wherein at the base station, the transmitting of the transmission IPTV stream to the mobile terminal comprises:

classifying packets of a received IPTV channel stream into packets for the base layer and packets for the enhancement layer, outputting the packets for the base layer to a first buffer and outputting the packets for the enhancement layer to a second buffer;

when the link state of the mobile terminal is received from the mobile terminal, determining the combination of the modulation technique and the coding rate to be applied to the enhancement layer based on the link state of the mobile terminal;

computing the transmission bit amount of the enhancement layer according to the combination of the modulation technique and the coding rate;

performing stream truncation for a stream of the enhancement layer according to the transmission bit amount; and transmitting an IPTV stream in which stream truncation has been performed to the mobile terminal according to the combination of the modulation technique and the coding rate.

11. The method of claim 10, further comprising, allocating a multicast connection identification (MCID) to the packets for the base layer and the packets for the enhancement layer.

12. The method of claim 10, wherein the combination of the modulation technique and the coding rate to be applied to the enhancement layer and the transmission bit amount of the enhancement layer are computed to make Equation 2 maximum $$\alpha \frac{\sum_{i=1}^{N} s_i(mc_i, mc_{EL})}{N} + (1-\alpha)\left(\frac{PSNR(R_{BL}+R_{Tr\_EL})-PSNR(R_{BL})}{PSNR(R_{BL}+R_{EL})-PSNR(R_{BL})}\right),$$

Equation 2 where $\alpha$ represents a constant ($0 \leq \alpha \leq 1$), $mc_{BL}$ represents fixed mc for base layer transmission, $mc_{EL}$ represents fixed mc for enhancement layer transmission, $R_{BL}$ and $R_{EL}$ represent bit amounts of the base layer and the enhancement layer which come out of an upper layer during a GOP interval, $R_{Tr\_EL}$ represents a bit amount of a truncated enhancement layer which is to be transmitted, PSNR(R) represents an estimation peek signal to noise ratio (PSNR) value in which a bit rate during a GOP interval is R, $$\sum_{i=1}^{N} s_i$$

represents the number of users who receive the enhancement layer, and $PSNR(R_{BL}+R_{Tr\_EL})$ represents an image PSNR value when the base layer and the truncated enhancement layer are received.

13. The method of claim 10, wherein the link state of the mobile terminal is acquired through a channel quality indicator (CQI).

14. The method of claim 8, wherein the transmission bit amount of the enhancement layer is determined according to a slot limitation in which the base layer and the enhancement layer have to be transmitted within the number of slots allocated for the IPTV stream.

* * * * *